UNITED STATES PATENT OFFICE.

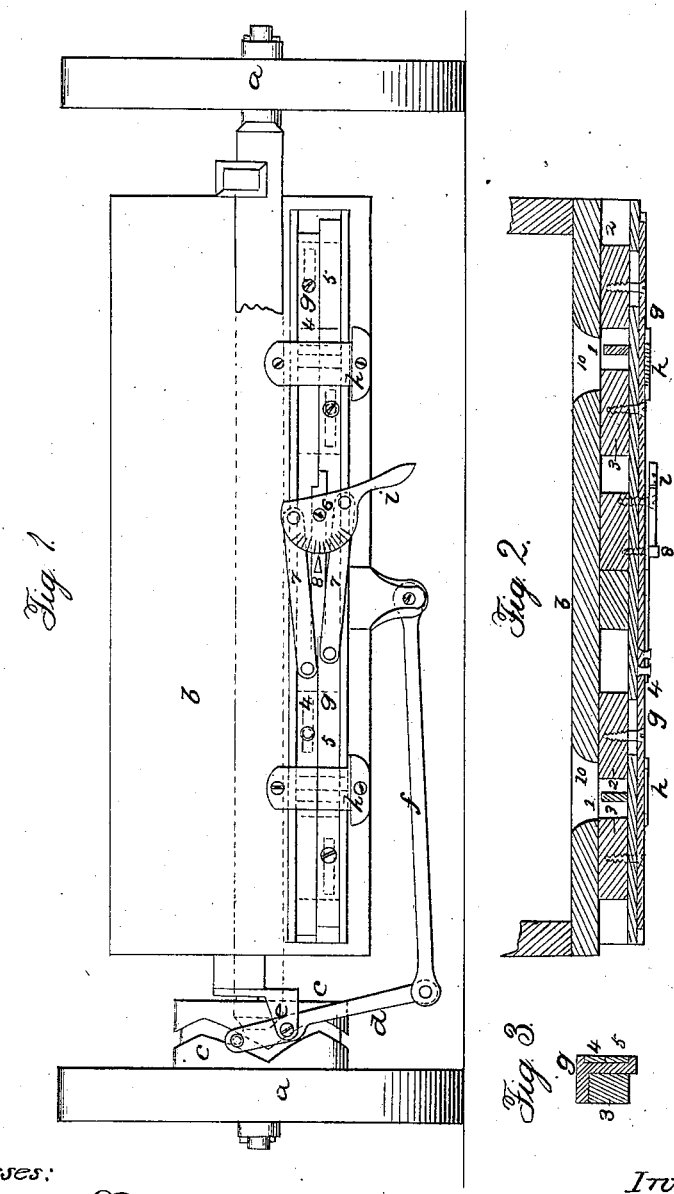

JOS. FOWLER AND F. M. BACON, OF WATERTOWN, WISCONSIN.

IMPROVEMENT IN SEEDING-MACHINES.

Specification forming part of Letters Patent No. 47,009, dated March 28, 1865.

*To all whom it may concern:*

Be it known that we, JOSEPH FOWLER and F. M. BACON, of Watertown, in the county of Jefferson and State of Wisconsin, have invented, made, and applied to use a certain new and useful Improvement in Seeding-Machines; and we do hereby declare the following to be a full, clear, and exact description of the said invention, reference being had to the annexed drawings, making part of this specification, wherein—

Figure 1 is an elevation of our seeding-machine with part of the frame receiving the tongue or pole removed. Fig. 2 is a sectional plan through the seed-delivering cells, and Fig. 3 is a cross-section of the slide in which said cells are formed.

Similar marks of reference denote the same parts.

The nature of our said invention consists in constructing seed-delivering cells in a slide in such a manner that they can be enlarged or diminished at pleasure, according to the character of seed to be sown or the quantity required per acre, which enlargement or decrease is effected by sliding blocks actuated by bars, as hereinafter set forth.

In the drawings, $a$ $a$ are wheels of any required size or character. $b$ is the seed-box. $c$ is a zigzag cam-wheel, giving motion to the lever $d$ on the fulcrum $e$, and by the connecting-rod $f$ moving the slide $g$ back and forth in loops or supporting-guides $h$ $h$ upon the seed-box $b$. The slide $g$ is formed in an ⌐-shape piece of wood or other material, in which partitions 1 1 are securely fastened. 2 2 and 3 3 are blocks within this slide $g$, that are attached respectively to the bars 4 and 5, that are in grooves in the face of $g$, the blocks 2 2 being attached to the bar 4 and the blocks 3 3 being attached to the bar 5, in all instances the screws attaching the same passing through slots in $g$, so that the blocks 2 2 and 3 3 can be slid nearer to or farther from the partitions 1 1 by moving the bars 4 and 5. This is effected by the lever $i$ on a fulcrum, 6, with the links 7 to the bars 4 and 5, and 8 is a stationary pin near an indicating-arc on the lever $i$, so that the amount of motion given to the bars 4 and 5 in opposite directions can be inspected, and consequently the attendant can know the distance that is left between the ends of the blocks 2 and 3 and partitions 1, which space forms the seed cells or cups, and as the slide $g$ reciprocates these cells receive the seed from the hopper $b$ through the openings 10 10 and convey said seed beyond the edge of the plates $h$ $h$, that support the bar $g$, and said seed-cells now having nothing at the bottom of them, the seeds drop out, and may be taken by pipes to be sowed in rows; or they may be scattered broadcast in any convenient manner. This mode of constructing the slide $g$ allows for easily regulating the size of the seed-cells, and the quantity delivered every reciprocation of the slide, and the partitions 1 1 act to agitate the seed at the opening from the hopper and cause it to fill the cells with greater uniformity.

What we claim, and desire to secure by Letters Patent, is—

The slide $g$, moving in the supports $h$, in combination with the blocks 2 and 3, bars 4 and 5, and lever $i$ to regulate the size of the seed-cells, in the manner and for the purposes set forth.

In witness whereof we have hereunto set our signatures this 30th day of June, 1864.

JOSEPH FOWLER.
F. M. BACON.

Witnesses:
CHARLES M. DUCASS,
AUGUSTUS DONCH, M. D.